(12) United States Patent
Rose et al.

(10) Patent No.: US 7,878,536 B2
(45) Date of Patent: Feb. 1, 2011

(54) SOLID PROPELLANT/LIQUID TYPE HYBRID GAS GENERATOR

(75) Inventors: James Michael Rose, Knoxville, TN (US); Lawrence Edward Herriford, Knoxville, TN (US); Stephen Craig Gold, Knoxville, TN (US); Brian Orgyle Thomas, Maryville, TN (US); Judah Lee Wilkins, Knoxville, TN (US); Robb Calvin Isbell, Knoxville, TN (US)

(73) Assignee: ARC Automotive, Inc., Knoxville, TN (US)

( * ) Notice: Subject to any disclaimer, the term of this patent is extended or adjusted under 35 U.S.C. 154(b) by 35 days.

(21) Appl. No.: 12/382,426

(22) Filed: Mar. 16, 2009

(65) Prior Publication Data

US 2010/0230942 A1  Sep. 16, 2010

(51) Int. Cl.
*B60R 21/26* (2006.01)
(52) U.S. Cl. ...................... 280/737; 280/741
(58) Field of Classification Search ................ 280/736, 280/737, 741; 102/530, 531
See application file for complete search history.

(56) References Cited

U.S. PATENT DOCUMENTS

| | | | |
|---|---|---|---|
| 3,785,674 A | 1/1974 | Poole et al. | |
| 3,862,866 A | 1/1975 | Timmerman et al. | |
| 5,449,041 A | 9/1995 | Galbraith | |
| 5,669,631 A * | 9/1997 | Johnson et al. | 280/741 |
| 6,076,468 A | 6/2000 | DiGiacomo et al. | |
| 6,616,183 B2 * | 9/2003 | Huber et al. | 280/736 |
| 6,676,157 B2 * | 1/2004 | Nanbu | 280/736 |
| 7,770,924 B2 * | 8/2010 | Cox et al. | 280/741 |
| 2002/0158454 A1 * | 10/2002 | Huber et al. | 280/736 |
| 2003/0137132 A1 * | 7/2003 | Last et al. | 280/736 |
| 2010/0013201 A1 | 1/2010 | Cox et al. | |

* cited by examiner

*Primary Examiner*—Faye M. Fleming
*Assistant Examiner*—Joseph Rocca
(74) *Attorney, Agent, or Firm*—Nixon & Vanderhye PC

(57) ABSTRACT

A gas generator comprising a housing having a mixing chamber and a pyrotechnic charge in the housing. A container having a liquid therein is disposed in the housing and has an open end and a closed end, with an end cap closing the open end and having a piston portion removably connected thereto and being movable within the liquid container to pressurize the liquid therein when the piston portion is separated from the end cap. The piston portion is positioned to be exposed to combustion gas from the pyrotechnic charge when it is ignited and is separable from the end cap when the combustion gas exceeds a predetermined pressure. In another embodiment, the liquid container may be a collapsible tube. The closed end of the liquid container has a weakened portion constructed to be opened when the pressure of the liquid in the container exceeds a predetermined pressure. The pyrotechnic charge and the weakened portion of the liquid container are in fluid communication with the mixing chamber so that combustion gases from the ignition of the pyrotechnic charge mix with and vaporize the liquid in the mixing chamber to generate a non-toxic, low temperature, low particulate inflation gas.

19 Claims, 7 Drawing Sheets

SOLID PROPELLANT/LIQUID TYPE HYBRID GAS GENERATOR

BACKGROUND OF THE INVENTION

1. Field of the Invention

The present invention relates generally to a gas generating device and more specifically, to a gas generating device which mixes liquid with the hot gaseous combustion products of a solid propellant or pyrotechnic charge.

2. Description of the Related Art

Various gas generating arrangements have been proposed for the purposes of inflating a safety restraint device such as an airbag. However, many of these arrangements have simply released the hot combustion products into the inflatable device with very little modification other than filtering to remove particulate matter.

In order to modify the gaseous products which are generated by the combustion of a solid propellant such as sodium azide mixed with an oxidizer such as potassium perchlorate, it has been proposed in U.S. Pat. No. 3,785,674 issued on Jan. 15, 1974 to Poole et al. to include a coolant chamber in the gas generator and to fill this chamber with a liquid halocarbon such as and to arrange for the halocarbon liquid to atomize in the nitrogen rich environment to reduce the temperature of the gas which is used to inflate the safety restraint (airbag). However, in this arrangement the gaseous combustion products are released directly into a chamber which contains the halocarbon liquid and which is closed by a burst disc. This of course, requires heating the liquid to its boiling point. The resulting mixture of gaseous halocarbon and hot combustion products is reactive, and part of the halocarbon decomposes. The decomposition of halocarbon results in the formation of lower molecular weight halogen compounds (including HCl and HF), which are toxic. For this reason, halocarbons are not used in hybrid airbag inflators.

U.S. Pat. No. 3,862,866 issued on Jan. 28, 1975 in the name of Timmerman et al. describes an arrangement which is essentially similar to the Poole et al. device, with the basic exception that water is used in place of halocarbon liquid. However, this arrangement is such that a slug of unvaporized liquid is apt to be shot out of the device only to result in the water being sprayed like a shower of rain throughout the interior of the airbag.

Thus, while these arrangements may find application as fire extinguishers of the nature disclosed in U.S. Pat. No. 5,449,041 issued on Sep. 12, 1995 in the name of Galbriath, wherein a solid propellant charge is ignited and used to drive a volume of liquid having flame suppressing capabilities, against a fire in a manner which suppresses and extinguishes it, they have failed to make the most efficient use of the cooling effect possible with the liquid used.

Another problem that these arrangements have failed to address is that of low temperature climates in which liquids, such as water, are apt to freeze and thus fail to achieve cooling of any degree, and/or even hinder the operation of the device by generating a block of solid material (ice) that is apt to either block the exits or turn into a missile which is fired out of the device in a highly undesirable manner.

The above problem is further aggravated in that the use of halocarbon liquids, which would tend to alleviate the freezing problem, are now severely restricted in light of various environmental considerations.

SUMMARY OF THE INVENTION

It is an object of the present invention to provide a gas generating device for airbags and the like, which achieves thorough mixing of the pyrotechnic combustion gas and liquid that results in an efficient cooled gas high yield and which therefore achieves an efficient use thereof.

It is a further object of this invention to provide such a gas generating device which maintains the coolant liquid at a temperature above its freezing point and thus maintains the device properly operable irrespective of the climate in which the safety device associated with the gas generator is used.

In brief, the above objects are achieved by an arrangement wherein the combustion of a relatively small pyrotechnic charge is used to pressurize a chamber of a suitable type of liquid, and force it out of the chamber into a mixing chamber wherein it is caused to intimately mix and vaporize in a high speed stream of gas resulting from the combustion of the charge. The sensible heat of the combustion products is absorbed by the liquid which is accordingly converted into a large volume of liquid vapor. The mixture of vaporized liquid and combustion gas is used to inflate the airbag with a non-toxic, low temperature, low particulate atmosphere.

In one embodiment of the invention, which may be used for any suitable airbag inflator application, such as a side impact inflator, an elongated, generally cylindrical housing, comprises at one end an igniter, a booster charge disposed inwardly of the igniter, and a pyrotechnic charge or solid propellant of any suitable type disposed inwardly of the booster charge. A cup-type partition surrounds the inner portion of the pyrotechnic charge and is provided with a plurality of first orifices on the periphery thereof spaced from the inner periphery of the housing, and one or more second orifices in the inner end thereof.

A chamber tube is disposed inwardly of the cup-type partition and comprises a cap at the end thereof adjacent to the partition, the cap being removably secured to the chamber tube and being slidable therein. The other end of the chamber tube is closed and comprises a thin or weakened section that will fail or open when exposed to a predetermined pressure. The chamber tube is filled with a suitable liquid such as an aqueous solution of a freezing point depressant such as calcium chloride. The periphery of the chamber tube is spaced inwardly from the inner periphery of the housing to provide an annular channel between the chamber tube and the housing for the combustion gases from the pyrotechnic charge when ignited that flow out of the first peripheral orifices in the cup-type partition for the propellant.

The other end of the housing comprises a mixing chamber that is defined by an inner housing member having an inner end disposed adjacent to the closed end of the chamber tube, the inner end of the inner housing member having an aperture in alignment with the weakened portion in the closed end of the chamber tube. The second partition comprises a plurality of peripheral third orifices that are spaced inwardly from the inner periphery of the housing and are in communication with the annular gas flow channel between the chamber tube and the housing that is turn in communication with the first peripheral orifices and the cup-type partition surrounding the propellant. At its outer end, the inner housing member is secured to or formed integrally with a flow manifold having a plurality of equally spaced radial exhaust ports for connection to a manifold and/or an airbag or the like.

In the operation of the one embodiment, the actuation of the igniter causes ignition of the booster charge and the propellant to generate combustion gas that flows out of the first peripheral orifices in the partition, through the annular flow channel surrounding the chamber tube and into the mixing chamber through the peripheral third orifices in the inner housing member at the end of the housing. The combustion gases also flow axially through the second orifice or orifices in the inner end of the partition to create sufficient pressure against the adjacent chamber cap to cause it to separate from the chamber tube and move inwardly therein to pressurize the liquid in the chamber tube. The increased pressure in the chamber tube causes the weakened portion at the closed end thereof to open to allow the pressurized liquid to flow into the mixing chamber through the aperture in the adjacent inner end of the inner housing member.

In the mixing chamber, the combustion gas and pressurized liquid are intimately mixed to vaporize the liquid. The sensible heat of the combustion products is absorbed by the liquid which is accordingly converted into a large volume of liquid vapor. The mixture of vaporized liquid and combustion gas then flows out of the radial exhaust ports of the flow manifold to inflate an airbag or the like with an essentially non-toxic, low temperature, low particulate atmosphere.

In another embodiment of the invention for an airbag inflator or the like, the housing can be circular or of short, compact cylindrical construction, and the igniter, booster charge and propellant can be spaced radially rather than longitudinally from the chamber tube. The operation of this embodiment is essentially the same as that of the one embodiment described herein.

In a still further embodiment of the invention, the chamber tube is a flexible tube that is collapsed by the combustion gas pressure to cause a weakened portion at the one end thereof to open to allow the pressurized liquid therein to flow into the mixing chamber.

DETAILED DESCRIPTION OF THE INVENTION

Figure 1A:
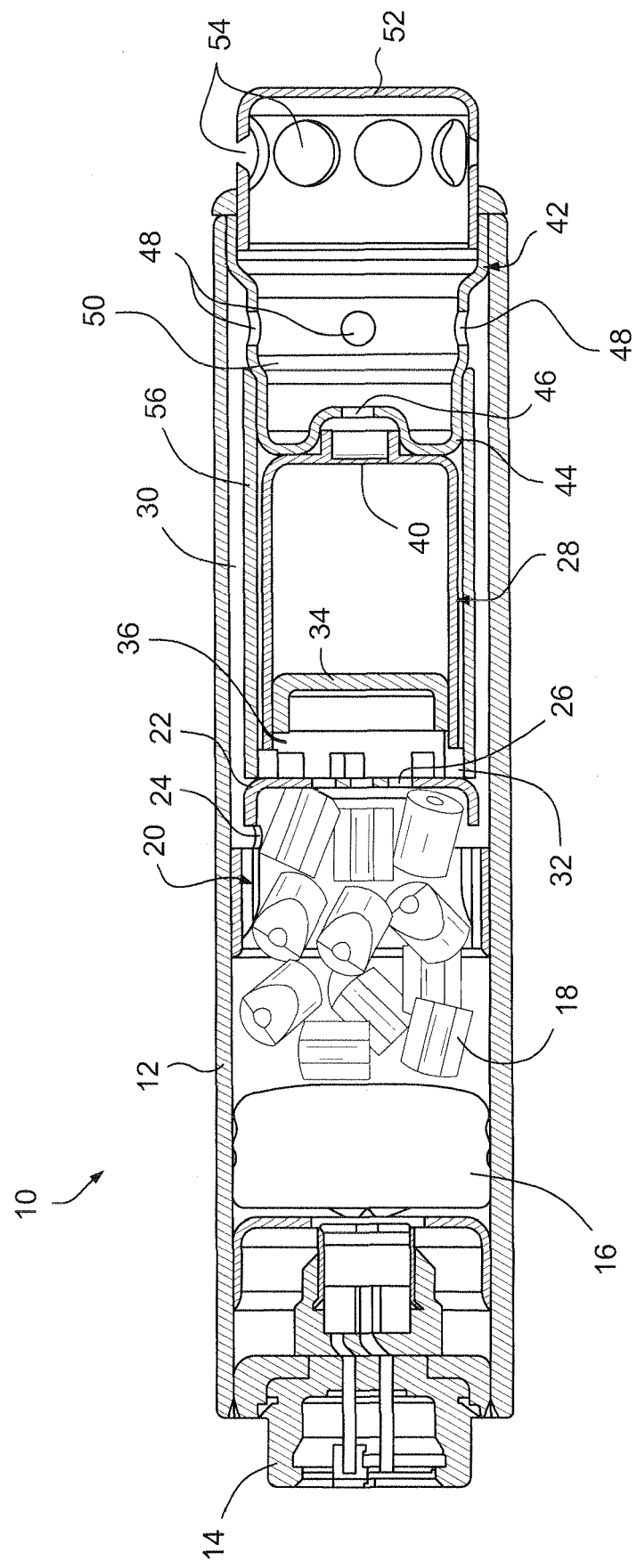
FIG. 1A is a side elevational view, with parts broken away, of one embodiment of the gas generator of the present invention.

FIG. 1A shows one embodiment of the present invention in the form of a gas generator 10 that may be used as a side impact or other inflator for an airbag or the like. The gas generator 10 comprises an elongated, generally cylindrical housing 12 formed of any suitable metal or other material having an igniter 14 of any suitable type at one end thereof. A booster charge 16 of any suitable type is disposed inwardly of the igniter 14 and a pyrotechnic charge or solid propellant 18 of any suitable type is disposed inwardly of the booster charge 16. A cup-like partition 20 surrounds the inner portion of the pyrotechnic charge or propellant 18 and has a reduced diameter end portion 22 with a plurality of first orifices 24 in the periphery thereof and a second orifice or orifices 26 in the inner end thereof.

A chamber tube 28 is disposed in the housing 12 inwardly of the end portion 22 of the partition 20 and is of a diameter less than the internal diameter of the housing 12 to provide an annular gas flow channel 30 therebetween that is in communication with the first orifices 24 in the periphery of the end portion 22 of the first partition 20. The chamber tube 28 comprises an end cap 32 that is removably connected thereto and is disposed adjacent to the end 22 of the partition 20. The chamber tube 28 and end cap 32 may be formed of any suitable material and may be connected together in a suitable manner. As an illustrative example, the chamber tube 28 and end cap 32 may be formed of a suitable plastic such as polypropylene that has low moisture permeability and is resistant to high and low temperatures. The end cap 32 may be adhesively or otherwise connected to the chamber tube 28 and provided with an inner piston portion 34 that is slidable within the chamber tube 28 when separated from the end cap 32 by exposure to a predetermined pressure. As an illustrative example, the piston portion 34 may be connected to the end cap 32 by a weakened or frangible section 36.

The chamber tube 28 is filled with a suitable liquid, such as a calcium chloride and water mixture to prevent freezing of the liquid when exposed to low temperatures and boiling of the liquid when exposed to high temperatures. As an illustrative example, the calcium chloride may be mixed with water to a concentration level of between 20 to 40% by weight which provides protection against freezing down to −50° C. and against boiling up to 115° C. Within the scope of the present invention, other suitable liquids may be used within the knowledge of one skilled in the art.

The other end of the chamber tube 28 is closed and is provided with a weakened portion 40 that is constructed to be opened when exposed to a predetermined liquid pressure within the chamber tube to create an exit opening for the liquid under pressure therein. An inner housing member 42 extends inwardly from the other end of the housing 12 and comprises an inner end portion 44 with an aperture 46 disposed adjacent to and in alignment with the weakened portion 40 of the chamber tube 28. The inner housing member 42 comprises a plurality of third orifices 48 in the periphery thereof that are in communication with the annular flow channel 30 between the chamber tube 28 and the housing 12. The inner housing member 42 defines a mixing chamber 50 therein for combustion gas flowing inwardly through the orifices 48 and pressurized liquid flowing inwardly from the chamber tube 28 through the aperture 46 in the end portion 44.

The inner housing member 42 may be connected at its outer end to a flow manifold 52 of any suitable type that may have a plurality of openings 54 for thrust-neutral operation and may be connected in any suitable manner to a manifold (not shown) and/or an airbag (not shown).

Figure 1B:
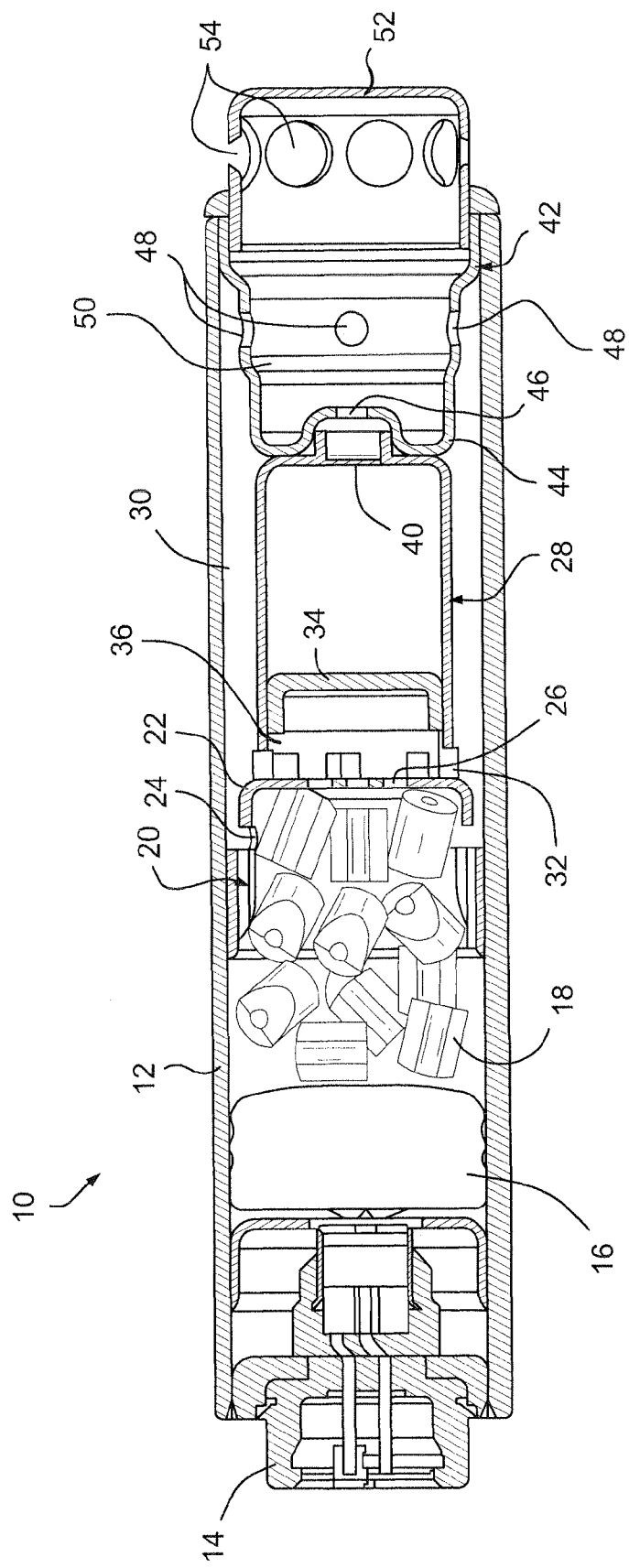
FIG. 1B is a side elevational view like FIG. 1A showing a modified gas generator construction.

To protect the chamber tube 28 from direct contact with hot combustion gases in the annular flow channel 30, it may be surrounded by a second tube 56 formed of any suitable material, such as metal. The second tube 56 may be secured to the inner housing member 42 in any suitable manner and serves to define a smooth annular flow channel 30 between it and the housing 12. The second tube 56 may be constructed so as not to be parallel or concentric with the inner peripheral surface of the housing 12 for the purpose of varying the width of the annular flow channel 30, if desired. Within the scope of the present invention, the second tube 56 may be omitted, as shown in FIG. 1B.

In the operation of the gas generator 10 shown in FIG. 1A, the actuation of the igniter 14 ignites the booster charge 16 and the pyrotechnic charge 18 to generate combustion gases that flow out of the first orifices 24 in the periphery of the end portion 22 of the partition 20 into the annular flow channel 30 between the chamber tube 28 and the housing 12. The hot combustion gases also flow out of the orifice or orifices 26 in the end portion 22 of the partition 20 into contact with the piston portion 34 of the end cap 32 of the chamber tube 28. The pressure of the combustion gas on the piston portion 34 serves to separate it from the end cap 32 by breaking the weakened portion 36 to cause the piston portion 34 to slide inwardly into the chamber tube and pressurize the liquid therein. The increased liquid pressure causes the failure of the weakened portion 40 in the end of the chamber tube 28 to enable the pressurized liquid to flow out of the chamber tube 28 through the aperture 46 in the adjacent end 44 of the inner housing member 42 and into the mixing chamber 50 thereof. The hot combustion gases flowing through the annular flow channel 30 also enter the mixing chamber 50 through the orifices 48 in the periphery of the inner housing member 42 to mix with the liquid entering the mixing chamber 50.

The hot combustion gases and the liquid are intimately mixed in the mixing chamber 50 to vaporize the liquid therein. The sensible heat of the combustion products is absorbed by the liquid which is accordingly converted into a large volume of vapor. The mixture of vaporized liquid and combustion gas then flows through the exit orifices 54 of the flow manifold 52 to inflate an airbag (not shown) or the like with a non-toxic, low temperature, low particulate atmosphere.

Figure 1C:
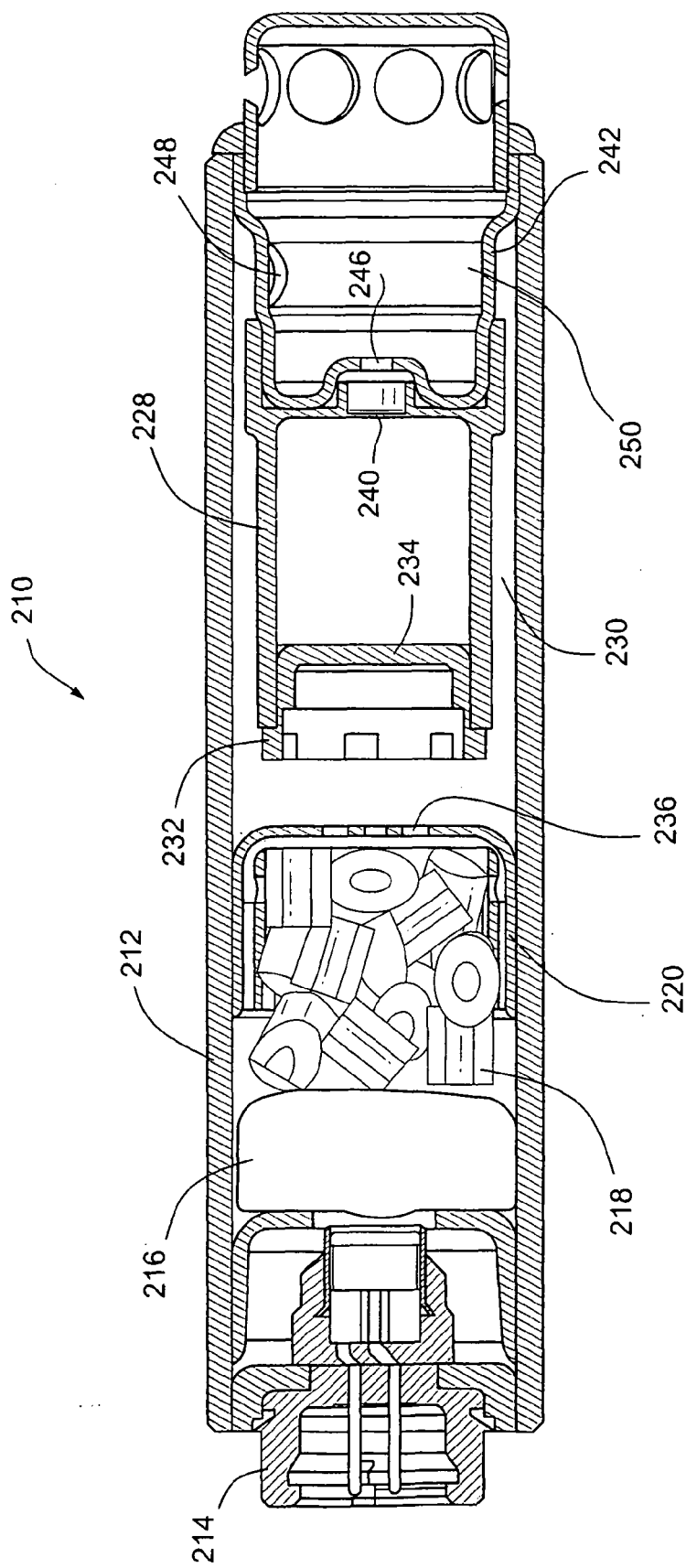
FIG. 1C is a side elevational view like FIG. 1A showing a further modified gas generator construction.

FIG. 1C illustrates another embodiment of a gas generator 210 that is similar in construction and operation to the gas generator 10 shown in FIG. 1A. Like the gas generator 10, the gas generator 210 shown in FIG. 1C generally comprises a housing 212, an igniter 214, a booster charge 216, a pyrotechnic charge 218, a cup-like partition 220 surrounding the inner portion of the pyrotechnic charge, a chamber tube 228 disposed inwardly of the partition 220 and comprising an end cap 232 and piston portion 234. The other end of the chamber tube 228 is provided with a weakened portion 240 and an inner housing member 242 extends inwardly from the other end of the housing 212 and comprises an inner end portion 244 with an aperture 246 disposed adjacent to and in alignment with the weakened portion 240 of the chamber tube 228. The inner housing member 242 comprises a plurality of third orifices 248 in the periphery thereof that are in communication with the annular flow channel 230 between the chamber tube 228 and the housing 212. The inner housing member 242 defines a mixing chamber 250 therein for combustion gas flowing inwardly through the orifices 248 and pressurized liquid flowing inwardly from the chamber tube 228 through the aperture 246 and the end portion 244.

The embodiment of the gas generator 210 shown in FIG. 1C differs from the gas generator shown in FIG. 1A in that the cup-like partition 220 does not have first orifices in the periphery thereof and the inner end thereof is provided with a second orifice or orifices 226 that are spaced from the end cap 232 of the chamber tube 228. Accordingly, combustion gases flowing through the second orifices 226 in the inner end of the partition 220 simultaneously pressurize the piston portion 234 of the chamber tube 228 and the annular flow channel 230 leading to the inner housing member 242 which defines the mixing chamber 250.

Figure 2:
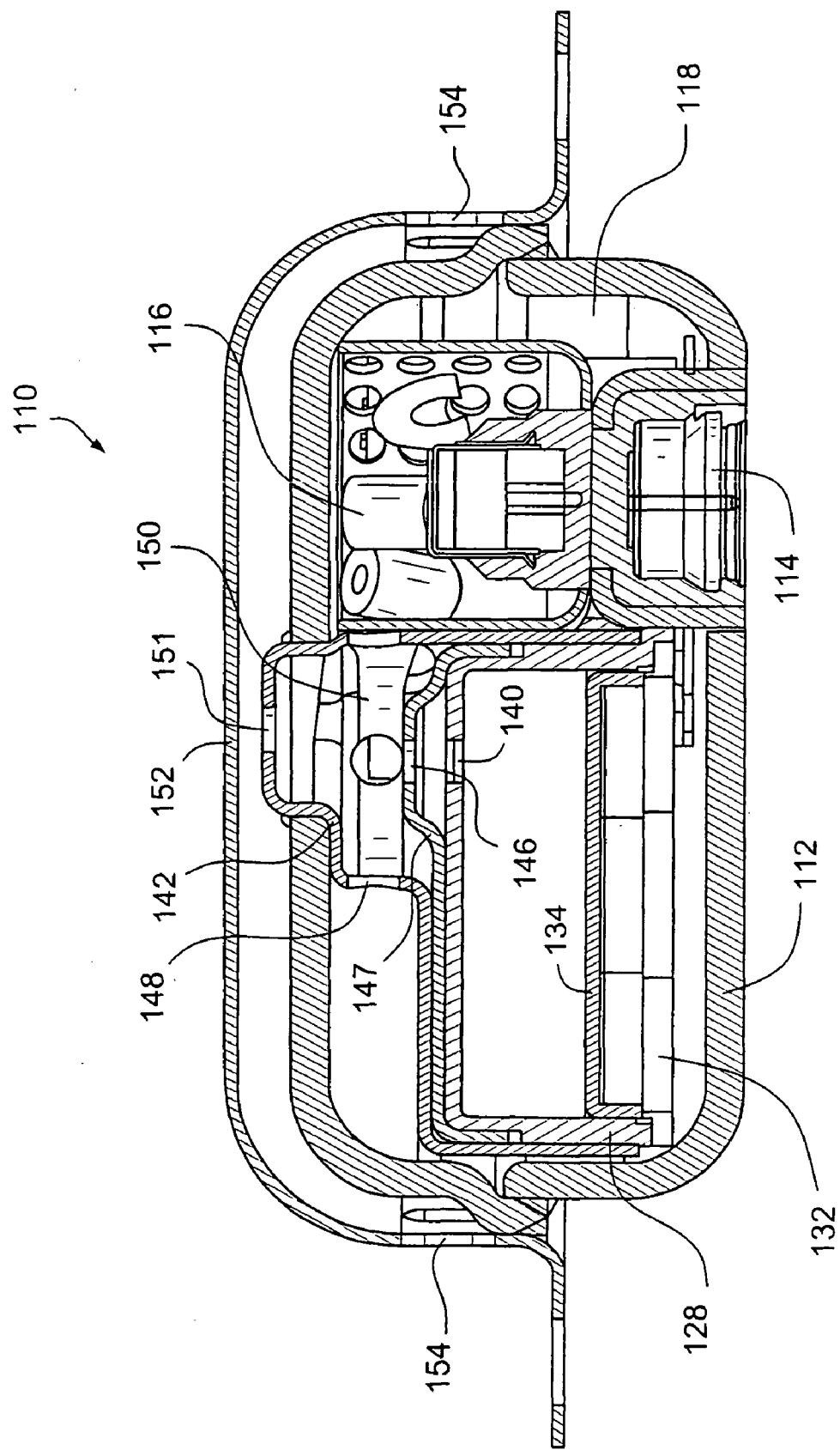
FIG. 2 is a side elevational view, with parts broken away, of another embodiment of the gas generator of the present invention.

FIG. 2 illustrates a further embodiment of a gas generator 110 that is similar in operation to the gas generator 10 shown in FIG. 1A and is formed with a compact circular or short cylindrical housing 112 for use as an airbag inflator, such as a frontal inflator, or the like.

In the gas generator 110, the igniter 114, booster charge 116 and pyrotechnic charge 118 are positioned in side by side relation next to the chamber tube 128 having the end cap 132 and the movable piston portion 134 disposed therein. The inner or upper closed end of the chamber tube 128 is formed with a weakened portion 140 in alignment with an exit orifice 146 in a partition 147. The exit orifice 146 opens into a mixing chamber 150 in the upper portion of an inner housing member 142 which has a plurality of orifices 148 in the periphery thereof that are exposed to the pyrotechnic charge 118 in the housing 112. The mixing chamber 150 is in communication with an upper or outer flow manifold portion 152 having radial openings 154 therein for communication with a manifold (not shown) and/or an airbag (not shown).

The operation of the gas generator 110 is the same as that of the gas generator 10 shown in FIG. 1A. The ignition of the propellant 118 generates combustion gases that enter the mixing chamber 150 through the orifices 148 in the inner housing member 142. The combustion gases also cause the piston portion 134 to separate from the end cap 132 of the chamber tube 128 so that the piston portion 134 moves inwardly in the chamber tube 128 to pressurize the liquid therein and open the weakened portion 140 in the closed end of the chamber tube 128 to cause liquid to flow through the exit opening 146 into the mixing chamber 150 wherein it mixes with the hot combustion gases entering the mixing chamber 150 through the orifices 148 in the inner housing member 142. The mixed combustion gases and vaporized liquid then enter the flow manifold portion 152 through the openings 151 in the mixing chamber 150 and exit the openings 154 therein to inflate an airbag (not shown) or the like.

Figure 2A:
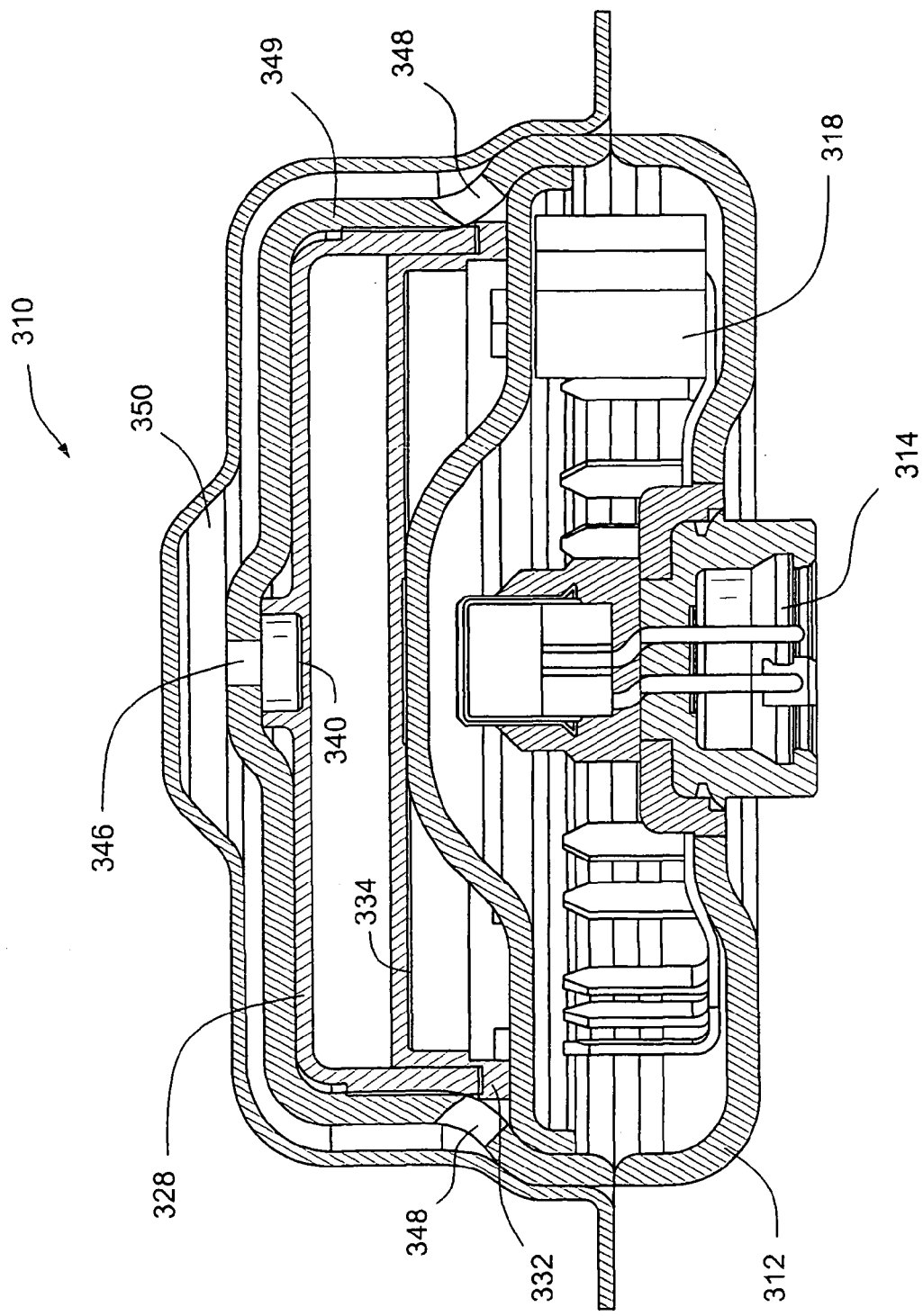
FIG. 2A is a side elevational view like FIG. 2, with parts broken away, of a further embodiment of the gas generator.

FIG. 2A illustrates another embodiment of a gas generator 310 that is similar in construction and operation to the gas generator 110 shown in FIG. 2. In the gas generator 310, the igniter 314 is located in the middle of the lower portion of the housing 312 and is surrounded by a pyrotechnic charge 318 that is in fluid communication with a mixing chamber 350 through orifices 348 in a partition 349.

A chamber tube 328 is disposed within the partition 349 above the igniter 314 and comprises an end cap 332 and a movable piston portion 334 removably connected thereto. The upper closed end of the chamber tube 328 is formed with a weakened portion 340 in alignment with an exit aperture 346 in the partition 349 which opens into the mixing chamber 350. The piston portion 334 is in fluid communication with the pyrotechnic charge 318.

The mixing chamber 350 is in fluid communication with a flow manifold (not shown) and/or an airbag (now shown).

The operation of the gas generator 310 is generally the same as that of the gas generator 110 shown in FIG. 2. The ignition of the propellant 318 generates combustion gases that enter the mixing chamber 350 through the orifices 348 in the partition 349. The combustion gases also cause the piston portion 334 to separate from the end cap 332 of the chamber tube 328 so that the piston portion moves inwardly in the chamber tube 328 to pressurize the liquid therein and open the weakened portion 340 in the closed end of the chamber tube 328 to cause liquid to flow through the exit opening 346 into the mixing chamber 350 wherein it mixes with the hot combustion gases entering the mixing chamber 350 through the orifices 348 in the partition 349. The mixed combustion gases and vaporized liquid then enter a flow manifold (not shown) or the like to inflate an airbag (not shown) or the like.

Figure 3A:
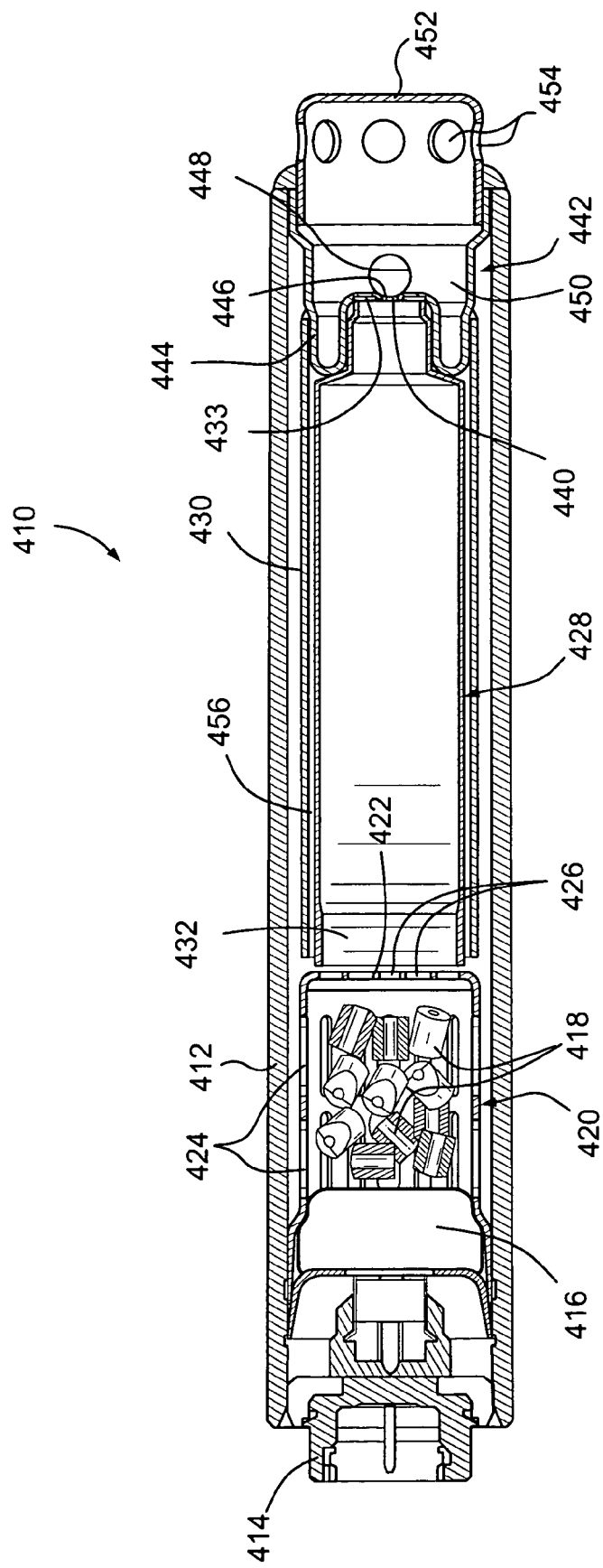
FIG. 3A is a side elevational view, with parts broken away, of a still further embodiment of the gas generator.
Figure 3B:
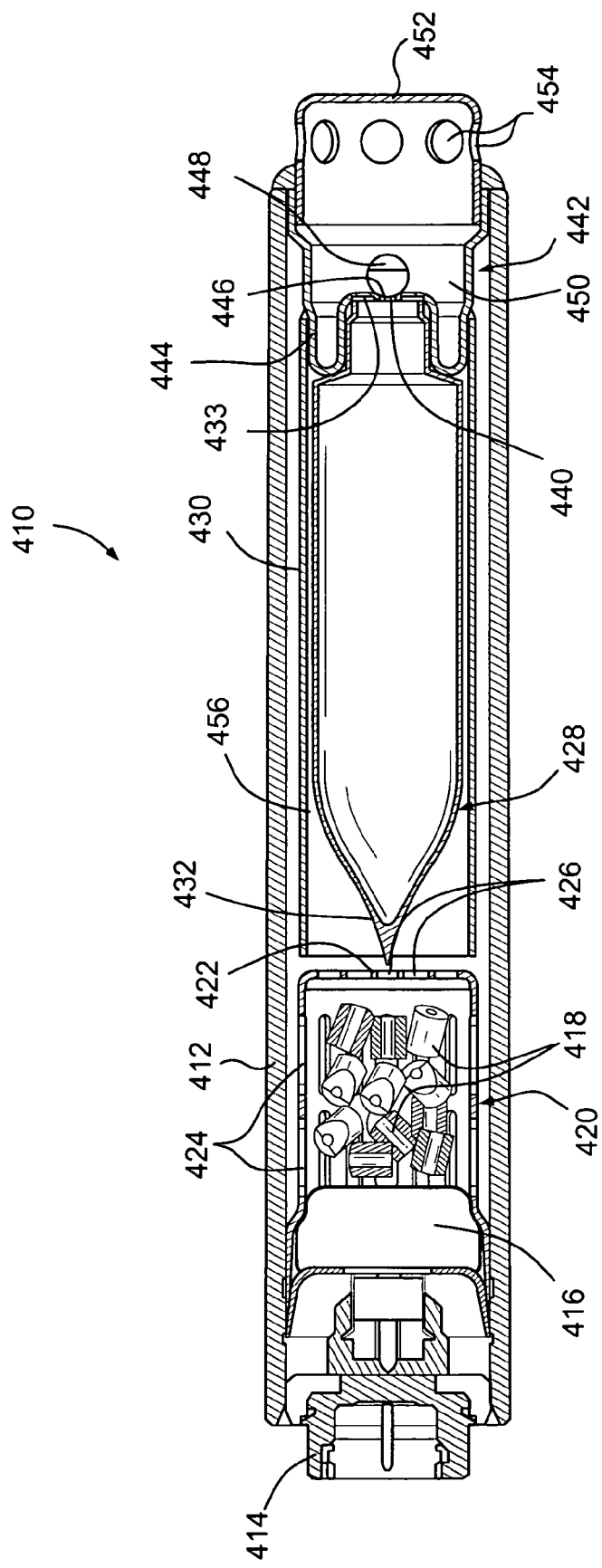
FIG. 3B is a top plan view, with parts broken away, of the gas generator shown in FIG. 3A.

FIGS. 3A and 3B illustrate a still further embodiment of a gas generator 410 that is similar in construction and operation to the gas generators 10 and 210 shown in FIGS. 1A, 1B and 1C. The gas generator 410 comprises an elongated, generally cylindrical housing 412 formed of any suitable metal or other material having an igniter 414 of any suitable type at one end thereof. A booster charge 416 of any suitable type is disposed inwardly of the igniter 414 and a pyrotechnic charge or solid propellant 418 of any suitable type is disposed inwardly of the booster charge 416. A cup-like partition 420 surrounds the booster charge 416 and pyrotechnic charge or propellant 418 and has a plurality of first orifices 424 in the periphery thereof and second orifices 426 in the inner end portion 422 thereof.

A chamber tube 428 is disposed in the housing 412 inwardly of the end portion 422 of the partition 420 and is of a diameter less than the internal diameter of the housing 412 to provide an annular gas flow channel 430 therebetween that is in communication with the first orifices 424 and second orifices 426 in the partition 420. The chamber tube 428 is a flexible tube having a flat, sealed outer end 432 and an inner end 433 having a weakened portion 440 that is constructed to be opened when exposed to a predetermined liquid pressure within the chamber tube to create an exit opening for the liquid under pressure therein. The chamber tube 428 may be formed of any suitable material, e.g., a suitable plastic such as polyethylene. The chamber tube 428 is filled with a suitable liquid, such as a calcium chloride and water mixture to prevent freezing of the liquid when exposed to low temperatures and boiling of the liquid when exposed to high temperatures. The calcium chloride concentration may be the same as that described herein with respect to the chamber tube 28 in FIGS. 1A and 1B.

An inner housing member 442 extends inwardly from the other end of the housing 412 and comprises an inner end portion 444 with an aperture 446 disposed adjacent to and in alignment with the weakened portion 440 of the chamber tube 428. The inner housing member 442 comprises a plurality of third orifices 448 in the periphery thereof that are in communication with the annular flow channel 430 between the chamber tube 428 and the housing 412. The inner housing member 442 defines a mixing chamber 450 therein for combustion gas flowing inwardly through the orifices 448 and pressurized liquid flowing inwardly from the chamber tube 428 through the aperture 446 in the end portion 444 of the inner housing member 442. The inner housing member 442 may be connected at its outer end to a flow manifold 452 of any suitable type that may have a plurality of openings 454 for thrust-neutral operation and may be connected in any suitable manner to a manifold (not shown) and/or an airbag (not shown).

To protect the chamber tube 428 from direct contact with hot combustion gases in the annular flow channel 430, it may be surrounded by a second tube 456 formed any of suitable material, such as metal. The second tube 456 may be secured to the inner housing member 442 in any suitable manner and serves to define a smooth annular flow channel 430 between it and the housing 412. The second tube 456 may be constructed so as not to be parallel or concentric with the inner-peripheral surface of the housing 412 with the purpose of varying the width of the annular flow channel 430, if desired. Within the scope of the present invention, the second tube 456 may be omitted, as shown in FIG. 1B.

In the operation of the gas generator 410 shown in FIGS. 3A and 3B, the actuation of the igniter 414 ignites the booster charge 416 and the pyrotechnic charge 418 to generate combustion gases that flow out of the first orifices 424 and the second orifices 426 in the partition 420 into contact with the adjacent flat end of the chamber tube 428 and into the annular flow channel 430 between the chamber tube 428 and the housing 412. The pressure of the combustion gas on the flexible chamber tube 428 causes it to collapse to pressurize the liquid therein. The increased liquid pressure causes the failure of the weakened portion 440 in the inner end of the chamber tube 428 to enable the pressurized liquid to flow out of the chamber tube 428 through the aperture 446 in the adjacent end 444 of the inner housing member 442 and into the mixing chamber 450 thereof. The hot combustion gases flowing through the annular flow channel 430 enter the mixing chamber 450 through the orifices 448 in the periphery of the inner housing member 442 to mix with the liquid entering the mixing chamber 450.

The hot combustion gases and the liquid are intimately mixed in the mixing chamber 450 to vaporize the liquid therein. The sensible heat of the combustion products is absorbed by the liquid which is accordingly converted into a large volume of vapor. The mixture of the vaporized liquid and combustion gas then flows through the exit orifices 454 of the flow manifold 452 to inflate an airbag (not shown) or the like with a non-toxic, low temperature, low particulate atmosphere.

Within the scope of the present invention, the components of the gas generators 10, 110, 210, 310 and 410 can be formed of any suitable materials, the pyrotechnic charge can be any suitable type of charge or propellant, and the liquid in the chamber tube can be any suitable type of liquid.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A gas generator comprising:

a housing having a mixing chamber;

a pyrotechnic charge in said housing' a container in said housing having a liquid therein and an open end and a closed end, an end cap closing said open end and having a piston portion removably connected thereto and being movable within said liquid container to pressurize the liquid therein when said piston portion is separated from said end cap, said piston portion being positioned to be exposed to combustion gas from said pyrotechnic charge when it is ignited and being separable from said end cap when said combustion gas exceeds a predetermined pressure;

said closed end of said liquid container having a weakened potion constructed to be opened when the pressure of the liquid in said container exceeds a predetermined pressure;

said pyrotechnic charge and said weakened portion of said liquid container being in fluid communication with said mixing chamber;

wherein when said pyrotechnic charge is ignited, the combustion gas therefrom enters said mixing chamber and also contacts said piston portion to separate it from said end cap when the combustion gas exceeds the predetermined pressure to move said piston portion inwardly within said liquid container to pressurize the liquid therein and open said weakened portion when the liquid pressure exceeds the predetermined pressure to enable liquid to flow from said liquid container into said mixing chamber wherein the liquid and combustion gas are mixed to vaporize the liquid and cool the combustion gas.

2. The gas generator of claim 1 wherein said mixing chamber is defined by an inner housing member disposed within said housing.

3. The gas generator of claim 2 wherein said inner housing member has orifices that control the flow of combustion gas and liquid into said mixing chamber.

4. The gas generator of claim 3 wherein a flow manifold is connected to said inner housing member and has exit openings therein for directing mixed combustion gas and vaporized liquid from said mixing chamber to a device to be inflated.

5. The gas generator of claim 3 wherein said housing is elongated and said liquid container is positioned therein between said pyrotechnic charge and said inner housing member, said inner housing member having an orifice disposed adjacent to the closed end of said liquid container in alignment with said weakened portion therein.

6. The gas generator of claim 5 wherein said end cap and said piston portion thereof are disposed adjacent to said pyrotechnic charge.

7. The gas generator of claim 6 wherein a partition encloses said pyrotechnic charge and separates it from said end cap; said first partition having an end portion of reduced size with a plurality of first orifices in the periphery thereof in spaced relation to an adjacent interior surface of said housing; said first partition also having an orifice in said end portion adjacent to said end cap.

8. The gas generator of claim 7 wherein said liquid container is elongated and is of less width than said housing to define an annular flow channel therebetween extending from said first orifices in said partition to said orifices in said inner housing member that open into said mixing chamber.

9. The gas generator of claim 8 wherein a tube surrounds said liquid container and extends from said partition to said inner housing member, said tube being spaced inwardly from the adjacent inner surface of said housing to define said annular flow channel between said liquid container and said housing.

10. The gas generator of claim 9 wherein said liquid container, said end cap and said piston portion are formed of plastic; and said tube is formed of metal.

11. The gas generator of claim 1, further comprising an igniter and booster charge in said housing for igniting said pyrotechnic charge.

12. The gas generator of claim 3 wherein said housing is of generally circular, non-elongated shape, said pyrotechnic charge is disposed adjacent to and in fluid communication with said inner housing member and said liquid container, and said liquid container is disposed within said inner housing member.

13. The gas generator of claim 12 wherein said inner housing member has a plurality of orifices in the periphery thereof that control the flow of combustion gas into said mixing chamber.

14. The gas generator of claim 13 wherein said inner housing member has an orifice adjacent to said weakened portion of said liquid container for controlling the flow of liquid into said mixing chamber.

15. The gas generator of claim 14 wherein said orifice of said inner housing member is disposed in a partition therein that separates said liquid container from said mixing chamber.

16. The gas generator of claim 1 wherein said liquid container, said end cap and said piston portion are formed of plastic.

17. The gas generator of claim 16 wherein said plastic is polypropylene.

18. The gas generator of claim 1 wherein said liquid is a mixture of water and calcium chloride.

19. The gas generator of claim 18 wherein the calcium chloride is approximately 20% to 40% of the water by weight.

\* \* \* \* \*